United States Patent [19]

Kim

[11] Patent Number: 5,355,265
[45] Date of Patent: Oct. 11, 1994

[54] CASSETTE LOADING DEVICE FOR A CASSETTE TAPE RECORDER

[75] Inventor: Joo D. Kim, Seongnam, Rep. of Korea

[73] Assignee: SamSung Electronics Co., Ltd., Suwon, Rep. of Korea

[21] Appl. No.: 901,152

[22] Filed: Jun. 19, 1992

[30] Foreign Application Priority Data

Jun. 24, 1991 [KR] Rep. of Korea ............... 91-9429[U]

[51] Int. Cl.$^5$ ............................................. G11B 17/04
[52] U.S. Cl. ............................................. 360/96.6
[58] Field of Search ................................ 360/96.6

[56] References Cited

U.S. PATENT DOCUMENTS

| | | | |
|---|---|---|---|
| 4,626,939 | 12/1986 | Takai et al. | 360/96.6 X |
| 4,703,372 | 10/1987 | Bender et al. | 360/96.6 X |
| 4,794,478 | 12/1988 | Kamezawa et al. | 360/96.6 |
| 4,808,011 | 2/1989 | Aarts et al. | 360/96.6 |
| 4,815,066 | 3/1989 | Horvath | 360/96.6 |

FOREIGN PATENT DOCUMENTS

| | | | |
|---|---|---|---|
| 15453 | 1/1990 | Japan | 360/96.6 |
| 04538 | 5/1989 | World Int. Prop. O. | 360/96.6 |

*Primary Examiner*—Richard E. Gluck
*Attorney, Agent, or Firm*—Robert E. Bushnell

[57] ABSTRACT

A cassette loading device for a cassette tape recorder capable of preventing damages of the drum or the cassette tape by guiding the tape during the loading of the cassette tape is disclosed. The device includes a housing shaft connected to links on the side walls of the housing, and mounted on the rear part of the front wall of the housing for revolving forward or backward during the loading or unloading of the cassette tape, a pivoting member for controlling the revolution of the housing shaft by rotating around a pin, and an elastic member mounted on the front wall of the housing for applying elastic force to the pivoting member, wherein the tape is accurately guided to the drum for loading thereto without any damage of the drum and the tape, and the constitution of the device is simplified at a low manufacturing cost.

16 Claims, 4 Drawing Sheets

CASSETTE LOADING DEVICE FOR A CASSETTE TAPE RECORDER

FIELD OF THE INVENTION

The present invention relates to a cassette loading device for a cassette tape recorder, and more particularly to a cassette loading device in which a cassette tape is guided to a drum during the loading of the tape cassette after mounting the tape cassette to the deck, thereby protecting the drum and the tape cassette from damage.

BACKGROUND OF THE INVENTION

Generally, as shown in FIGS. 1A, 1B and 1C, a cassette tape recorder such as an ultra miniature video camera places a tape cassette 10 to a deck 12. When the tape cassette 10 is inserted into a housing 11, the housing 11 is pushed toward the deck 12 for loading the tape cassette 10 to the deck 12 by lifting and lowering links 13a and 13b installed on a side of the housing 11.

A rack gear 13c located at one side of the link 13a is engaged with a connecting gear 14a of a housing shaft 14 which is laterally extended in the housing 11, so that the links 13a and 13b installed on a side of the housing 11 are driven simultaneously.

Thereafter, under play mode, the cassette tape moves toward a drum 101 on a main chassis 100 to load, so that information can be recorded to or regenerated from the cassette tape. The recorder also includes a capstan motor 102, a loading motor 103, and a sub-chassis 110 for sliding onto the main chassis 100.

However, during the loading of the cassette tape to the drum after as described above, it often happens that the cassette tape is grasped by an upper edge of the drum, thereby causing damage to the drum and the tape. Thus there is felt a need for a device for guiding the tape to the drum.

In order to solve this problem, there has been proposed a device, and this device is illustrated in FIG. 2. As shown in FIG. 2, a lever 15 is mounted on a side of the front wall of the housing 11 to be pivoted around a pin 15a. A slider 17 is mounted by means of a spring 16 approximately in parallel with the housing 11 and connected to one end of the lever 15 by a connecting pin 15b.

Meanwhile, pivoting means 18 is installed to the other end of the slider 17, and a securing pin 18a is provided on the top of the pivoting means 18 in such a manner as to be inserted into between engaging pieces 17a of the slider 17.

After the insertion of the tape cassette 10 into the housing 11 and during the loading of the tape cassette 10 to the deck 12 as illustrated in FIG. 1, the tape is guided by the pivoting means 18 before being placed on the drum.

When the lever 15 pivots clockwise around the pin 15a, the slider 17 moves to the right side by the action of the spring 16. Consequently, the pivoting means 18 pivots by 90 degrees around the pin 18b for loading the tape to the drum.

However, the above described conventional device is complicated in its structure, thereby lowering the productivity and reliability.

SUMMARY OF THE INVENTION

The present invention is intended to overcome the above described disadvantages of the conventional techniques.

Therefore, it is the object of the present invention to provide a cassette loading device for a cassette tape recorder, in which pivoting means is actuated by utilizing the revolving of a housing shaft of a housing for loading a cassette tape to a drum through an accurate guiding thereof, simplifying the constitution of the device, and making it possible to save the manufacturing cost.

In order to achieve the above object, according to the present invention, the cassette loading device for a cassette tape recorder capable of preventing damages of the drum and the tape by guiding the tape while the loading the tape, comprises a housing shaft mounted on a rear part of a front wall of a housing and connected to the links on a side wall of the housing so as to revolve forward or backward during the loading or unloading of the tape, pivoting means controlled by the revolution of the housing shaft and pivoting by 90 degrees around a pin, and elastic means mounted one side of the front wall of the housing in order to provide elastic force to the pivoting means.

BRIEF DESCRIPTION OF THE DRAWINGS

The above object and other advantages of the present invention will become more apparent by describing in detail the preferred embodiment of the present invention with reference to the attached drawings, in which.

DESCRIPTION OF THE PREFERRED EMBODIMENT

Figure 3:
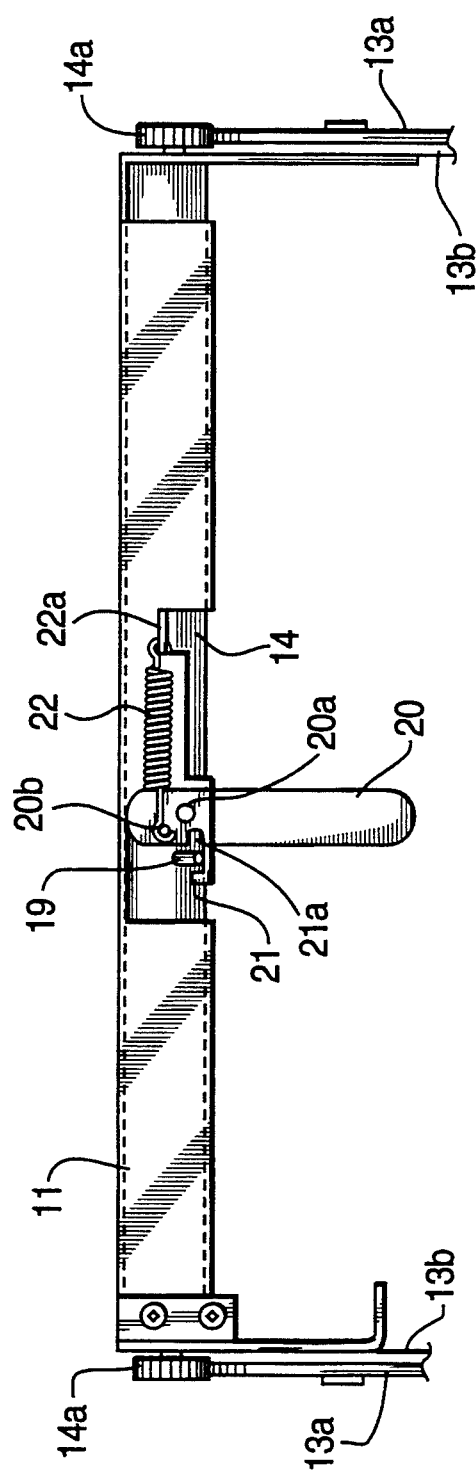
FIG. 3 is a schematical front view of a cassette loading device for a cassette tape recorder according to the present invention.
Figure 4A:
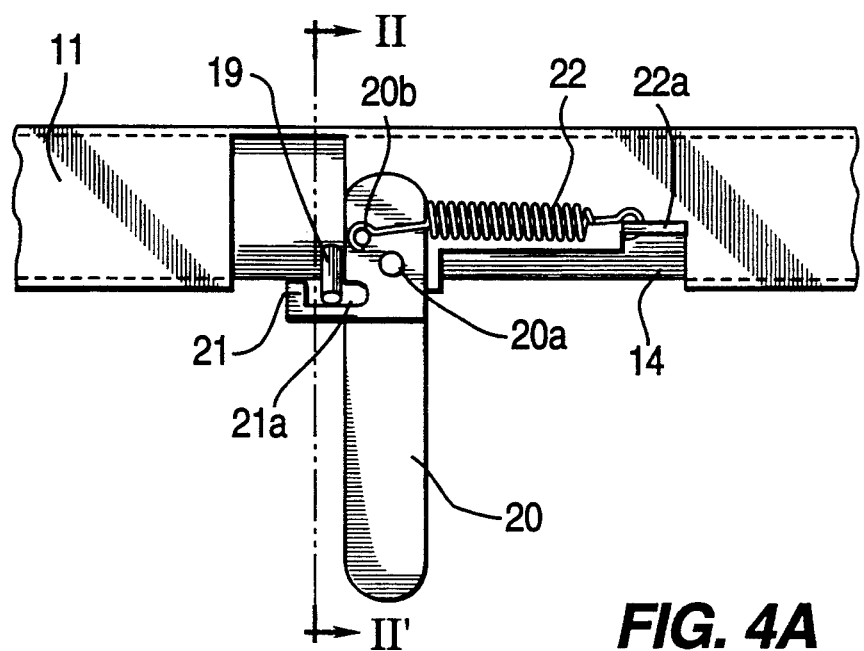
FIGS. 4A and 4B are front views respectively illustrating the critical portions of the device of FIG. 3 for explaining their operations; ad
Figure 4B:
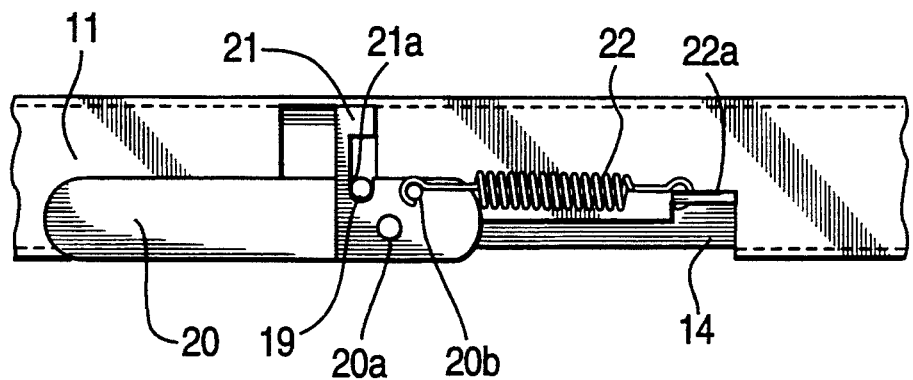
Figure 5:
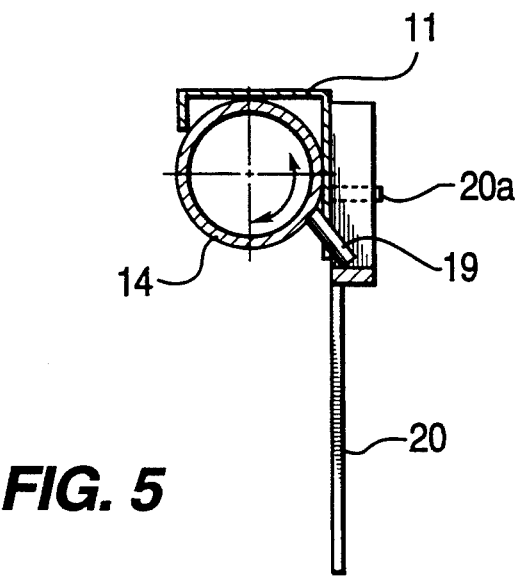
FIG. 5 is a sectional view taken along the line A—A' of FIG. 4A.

FIGS. 3 to 5 illustrate the cassette loading device for a cassette tape recorder according to the present invention, and, as shown in FIG. 3, a housing shaft 14 is mounted on a rear of a front wall of a housing 11, the housing shaft 14 extending between the side walls of the housing 11 in order to laterally support the housing 11.

Figure 1A:
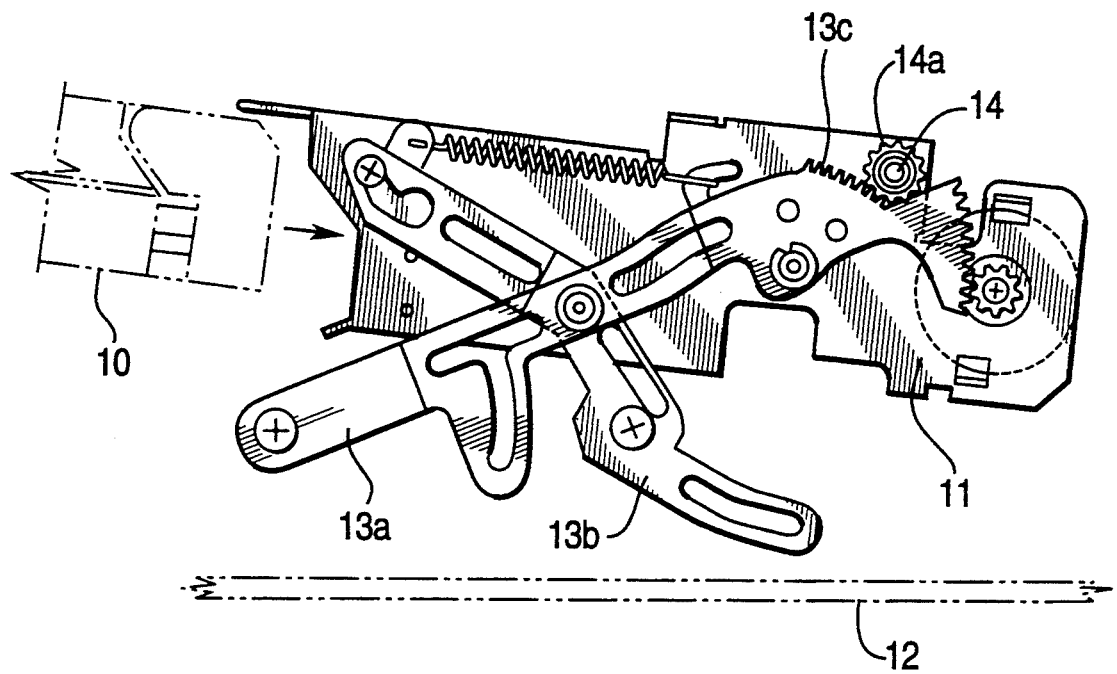
FIGS. 1A, 1B and 1C are sides views of a housing of a general tape recorder.
Figure 1B:
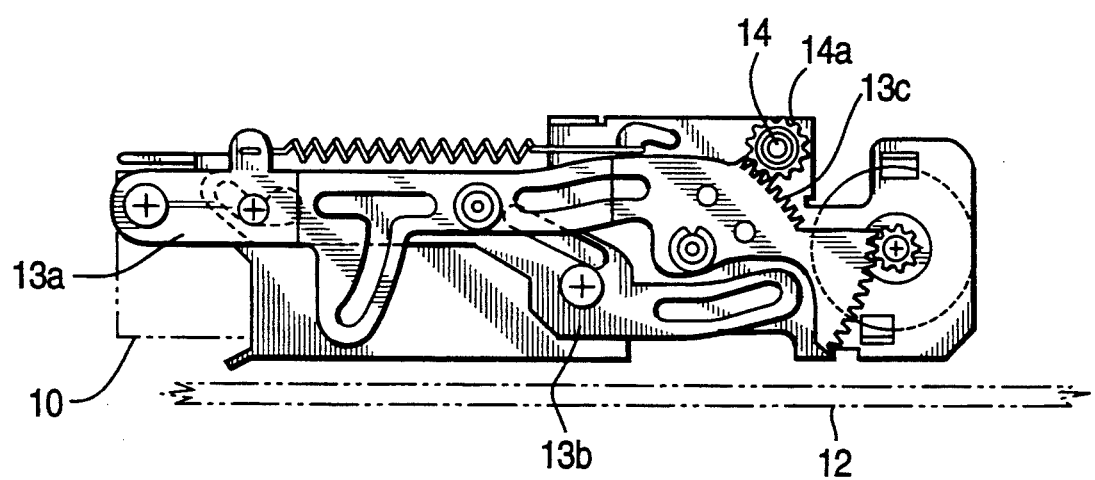
Figure 1C:
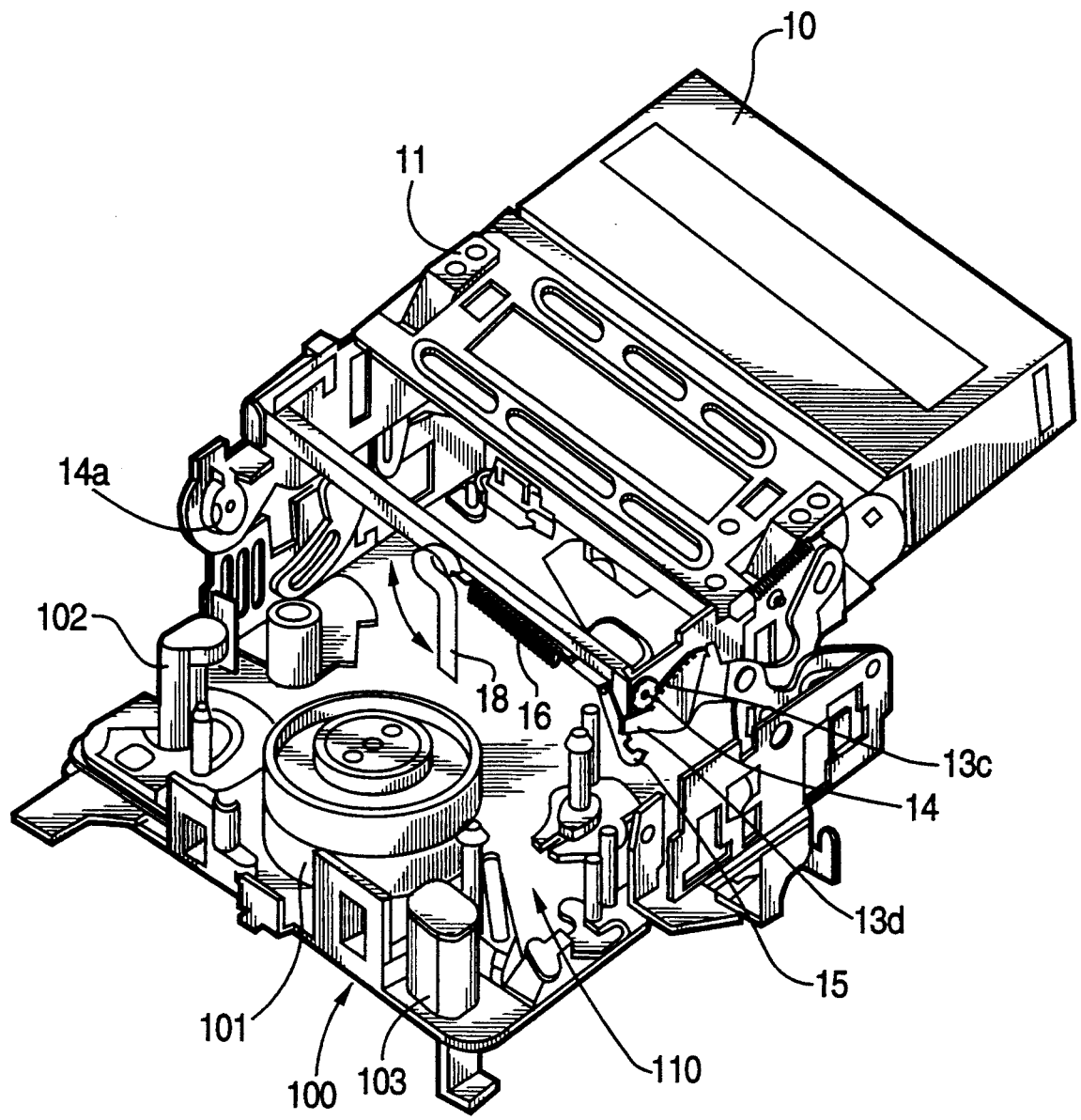
Figure 2:
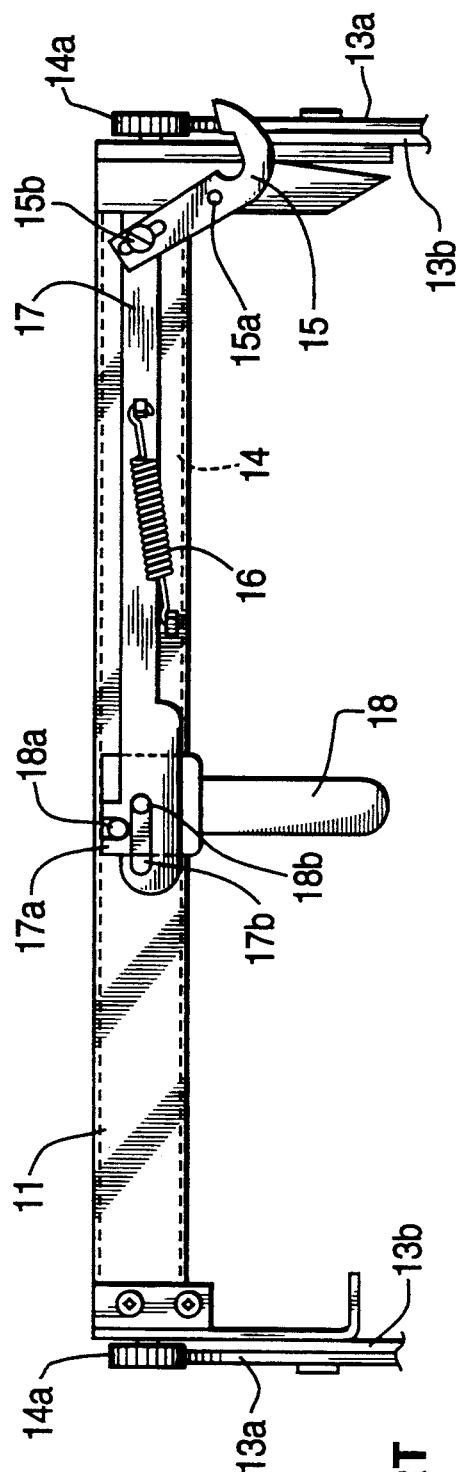
FIG. 2 is a schematical front view of a conventional cassette loading device.

Similarly to the conventional one of FIG. 1, the housing shaft 14 comprises a connecting gear 14a engaged with a rack gear 13c, the rack gear 13c being formed on one of links 13a and 13b mounted on the housing 11. Thus, the shaft 14 revolves forward and backward in response to the ascending and descending of the housing 11.

Further, an engaging pin 19 projects from substantially in the middle of the shaft 14, and pivoting means 20 are mounted on the housing 11 and on a side of the engaging pin 19.

One end of the pivoting means 20 is pivotally connected to the housing 11 with a pivoting pin 20a and a lock piece 21 provided with a slot 21a is also connected to the same end of the pivoting means 20, so that the lock pin 21 can be engaged to or released from the engaging pin 19 of the housing shaft 14.

Meanwhile, a securing pin 20b is provided to a side of the pivoting pin 20a of the pivoting means 20, and elastic means 22 are mounted between the securing pin 20b and an engaging piece 22a, so that elastic force should be applied during the pivoting of the pivoting means 20.

In the device of the present invention as described above, if the top of the housing 11 is pressed down after inserting a tape cassette 10 into the housing 11 as shown in FIG. 1, the housing 11 descends to the deck 12 by the links 13a and 13b mounted on the housing 11 for loading the tape cassette 10 thereon.

Accordingly, under the initial state as shown in FIGS. 4A and 5, the pivoting member 20 guides the tape as a first phase, so that the tape should be positioned on a drum (not shown). Under this condition, the housing shaft 14 pivots upwardly, and therefore, a lock piece 21 engaged with the engaging pin 19 is released therefrom. At the same time, the pivoting means 20 is pivoted 90 degrees clockwise as shown in FIG. 4B by the elastic means 22 which has been subjected to a tension, while the engaging pin 19 is secured into the slot 21a of the lock piece 21. Thereafter, the tape performs its function being loaded on the drum.

On the other hand, when the cassette tape cassette is taken out, the connecting gear 14a of the housing shaft 14 revolves clockwise due to the lifting of the links 13a and 13b as shown in FIG. 1B, the engaging pin 19 of the housing shaft 14 pushes the lock piece 21 to move down shown in FIG. 4B. Consequently, the pivoting means 20 is restored to the initial state of FIGS. 4A and 5, after giving a tension to the elastic means 22.

According to the tape settling device of the present invention, the pivoting means is actuated by utilizing the revolutions of the housing shaft during the ascending or descending of the housing after inserting the tape, and therefore, the tape is guided to the drum in an accurate manner. Further, the constitution of the device of the present invention is simplified, thereby making it possible to save the manufacturing cost.

What is claimed is:

1. A tape cassette loading device for a cassette tape recorder for minimizing damage of a drum and a cassette tape by guiding said cassette tape during the loading of said tape cassette, said device comprising:
   a housing;
   a housing shaft mounted on a front wall of said housing and connected with a plurality of links mounted on first and second sides of said housing, said housing shaft revolving in a first rotational direction during loading and in a second rotational direction during unloading of said tape cassette;
   pivoting means having a first end pivotally connected to said housing by a pivoting pin, said pivoting means rotating around said pivoting pin in response to the revolution of said housing shaft;
   a lock piece having a slot, said lock piece connected to said first end of said pivoting means;
   an engaging pin projecting from said housing shaft, engaging said lock piece, and thereby causing the rotation of said pivoting means as said housing shaft revolves; and
   elastic means mounted on the front wall of said housing for supplying elastic force to said pivoting means.

2. The tape cassette loading device as claimed in claim 1, wherein said housing shaft revolves in said first rotational direction in response to descending motion of said housing and in said second rotational direction in response to ascending motion of said housing.

3. The tape cassette loading device as claimed in claim 1, wherein said engaging pin engages within said slot of said lock piece when said tape cassette is in a loaded position.

4. The tape cassette loading device as claimed in claim 1, wherein said engaging pin is withdrawn from said slot of said lock piece when said tape cassette is in an unloaded position.

5. The tape cassette loading device as claimed in claim 1, wherein said pivoting means rotates approximately ninety degrees about said pivoting pin while said tape cassette is loading.

6. The tape cassette loading device as claimed in claim 1, wherein said pivoting means rotates approximately ninety degrees about said pivoting pin while said tape cassette is unloading.

7. The tape cassette loading device as claimed in claim 1, further comprised of said housing shaft having first and second connecting gears positioned on first and second ends of said housing shaft, respectively, said first and second connecting gears respectively engaging first and second rack gears positioned on two of said plurality of links to enable the revolution of said housing shaft upon loading and unloading of said tape cassette.

8. A tape cassette loading deice for a cassette tape recorder for minimizing damage of a drum and a cassette tape by guiding said cassette tape during the loading of said tape cassette, said device comprising:
   a shaft mounted on a front wall of a receptacle and connected with a plurality of couplers mounted on first and second sides of said receptacle, said shaft revolving in a first rotational direction during loading and in a second rotational direction during unloading of said tape cassette;
   rotating means having a first end rotatably connected to said receptacle by a fixed pin, said rotating means pivoting around said fixed pin in response to the revolution of said shaft;
   locking means having a recess, said locking means being connected to said first end of said rotating means;
   a contact pin projecting from said shaft, said contact pin engaging with said locking means to produce said pivoting of said rotating means; and
   biasing means mounted on said front wall of said receptacle, for supplying elastic force to said rotating means.

9. The tape cassette loading device as claimed in claim 8, further comprised of said shaft revolving in said first rotational direction in response to descending motion of said receptacle and revolving in said second rotational direction in response to ascending motion of said receptacle.

10. The tape cassette loading device as claimed in claim 8, further comprised of said contact pin engaging within said recess of said locking means when said tape cassette is in a loaded position.

11. The tape cassette loading device as claimed in claim 8, further comprised of said contact pin withdrawing from said recess of said locking means when said tape cassette is in an unloaded position.

12. The tape cassette loading device as claimed in claim 8, further comprised of said rotating means pivoting ninety degrees about said fixed pin when said tape cassette is loading.

13. The tape cassette loading device as claimed in claim 8, further comprised of said rotating means pivoting ninety degrees about said fixed pin when said tape cassette is unloading.

14. The tape cassette loading device as claimed in claim 8, further comprised of said shaft having first and second connecting gears positioned on first and second ends of said shaft, respectively, said first and second connecting gears respectively engaging first and second rack gears positioned on two of said plurality of couplers to enable the revolution of said shaft upon loading and unloading of said tape cassette.

15. A method for loading a tape cassette into a cassette tape recorder, comprising the steps of:

placing the tape cassette into a receptacle;

pressing a top portion of said receptacle to produce descension of said receptacle upon a tape deck;

applying a lateral force to a first end of pivoting means in response to said descension of said receptacle;

revolving a shaft mounted on a front wall of said receptacle and connected with a plurality of links mounted on first and second sides of said receptacle, said revolution of said shaft producing upward movement of an engaging pin attached to said shaft in response to said descension of said receptacle;

rotating said pivoting means about a pivoting pin connecting said pivoting means to said receptacle in response to said application of said lateral force and said upward movement of said engaging pin;

guiding a tape borne within said tape cassette towards a drum carrying a plurality of means for reproducing information stored on the tape by said rotation of said pivoting means; and inserting said engaging pin into a slot of a lock piece connected to said pivoting means for locking said pivoting means into a loaded position when rotation of said pivoting means stops.

16. The method as claimed in claim 10, further comprised of a spring for applying said lateral force to said first end of said pivoting means.

* * * * *

UNITED STATES PATENT AND TRADEMARK OFFICE
CERTIFICATE OF CORRECTION

PATENT NO. : 5,355,265
DATED : October 11, 1994
INVENTOR(S) : Joo Duk Kim

It is certified that error appears in the above-indentified patent and that said Letters Patent is hereby corrected as shown below:

On the title page, item [75] Inventor: change "Joo D. Kim" to --Joo Duk Kim--.

Column 3, line 20, change "20" to --20--;
        line 36, delete "cassette" preceding "tape"; and
        line 31, insert --as-- preceding "shown".

Column 6, claim 16, line 19, change "claim 10" to --claim 15--.

Signed and Sealed this

Thirteenth Day of December, 1994

Attest:

BRUCE LEHMAN

*Attesting Officer*      *Commissioner of Patents and Trademarks*